Patented Mar. 19, 1946

2,396,920

UNITED STATES PATENT OFFICE 2,396,920

ETHYLENE POLYMERIZATION PROCESS

Alfred T. Larson, Wilmington, Del., assignor to E. I. du Pont de Nemours & Company, Wilmington, Del., a corporation of Delaware No Drawing. Application April 10, 1941, Serial No. 387,863

5 Claims. (Cl. 260—94)

This invention relates to processes for polymerizing ethylene either alone or in admixture with one or more other polymerizable organic compounds.

Various methods are known for polymerizing ethylene alone and in admixture with other polymerizable organic compounds. Thus, U. S. 2,153,553 describes the prepartion of polymers of ethylene, which are solid at normal temperatures, by subjecting the ethylene to pressures in excess of 500 atmospheres at temperature in the range of 100° to 400° C. U. S. 2,188,465 describes an improvement over the method of U. S. 2,153,553, the improvement residing in carrying out the polymerization in the presence of from 0.01 to 5% of molecular oxygen. U. S. 2,200,429 describes the preparation of interpolymers of ethylene with other polymerizable organic compounds at pressures in excess of 500 atmospheres and at temperatures in the range of 100° to 400° C., preferably in the presence of small but definite amounts of molecular oxygen.

H. H. Storch, J. Am. Chem. Soc. 56, 374–378 (1934) reports that oxgen has an accelerating effect on the polymerization of ethylene. Storch states that at 377° C. and 141.5 cm. of ethylene pressure and a contact time of 2 hours the presence of 0.02% oxygen about doubles the yield of polymer over that obtained in the absence of oxygen. According to the author one molecule of oxygen causes about 85 additional molecules of ethylene to polymerize.

It is also known that methods which are effective for the preparation of high molecular weight polymers and interpolymers of vinyl and vinylidene compounds are not effective for polymerizing gaseous unsaturated organic compounds such as isobutylene. While this may be due in part to handling difficulties, even when liquefied, gaseous hydrocarbons are not known to be converted to high molecular weight polymers by the smooth peroxide catalyzed polymerization characteristic of such vinyl and vinylidene compounds as vinyl acetate, styrene and methyl methacrylate. Thus, liquid isobutylene requires specific halide catalysts and temperatures below 0° C. for conversion to a high molecular weight polymer.

In attempts to develop a simpler and more practical method for polymerizing ethylene to high molecular weight polymers than the methods described in the aforementioned patents a systematic study was made of the water-peroxide technique under a wide variety of conditions. Although on the basis of Storch's teachings it was to be expected that the rate of reaction and yield of polymer would vary directly with the molecular oxygen content of the ethylene the actual results showed the opposite to be true. That is, all other factors remaining constant, the higher the oxygen content of the ethylene the lower the rate of reaction and yield of polymer, the lower the intrinsic viscosity of the polymer obtained, and the higher the catalyst requirements of the reaction. Following this unexpected discovery of the remarkable role played by oxygen in the water-peroxide catalyzed polymerization of ethylene, it was found that polymer having high intrinsic viscosity in high yield and with low catalyst requirement was obtained provided the oxygen content of the ethylene in the reaction vessel was reduced to below 400 parts per million and preferably below 5 parts per million.

It is accordingly an object of this invention to provide a method for polymerizing ethylene alone and in admixture with one or more other polymerizable organic compounds to produce polymers of high intrinsic viscosity. It is another object to provide a process for producing such polymers in high yield. It is still a further object to provide such a process which is free of the disadvantages inherent in the prior art methods and which is adaptable to large scale operations.

The above and other objects appearing hereinafter are accomplished by subjecting ethylene alone or admixed with at least one other polymerizable organic compound to polymerizing conditions in the presence of an aqueous medium and a polymerization catalyst, said process being characterized by the fact that the system is deoxygenated before pressuring with ethylene and employs ethylene containing less than 400 parts per million of oxygen, generally less than 50 and preferably less than 5 parts per millon of oxygen.

Since commercial ethylene obtained by dehydrating ethanol contains about 1000 parts per million of molecular oxygen, in practicing the invention the ethylene is deoxygenated to reduce its oxygen content to below 400 parts per million, generally below 50 parts per million, and preferably below 5 parts per million. Inasmuch as oxygen present in the system in which the polymerization is to be carried out would raise the oxygen content of the ethylene, the system after charging with deaerated water and peroxide compound catalyst, and adjustment of the pH, if desired, is closed, and the system swept with deoxygenated nitrogen to remove air. Ethylene of the quality indicated above is then compressed to the desired pressure, before or after which the vessel is placed in an agitating rack, and the temperature adjusted to that at which it is desired to carry out the reaction. The pressure on the system is maintained by periodic additions of ethylene. After the desired reaction has occurred the reaction vessel is opened, the polymer removed, thoroughly washed, and dried.

The following examples are submitted to illustrate and not to limit this invention. Unless otherwise stated parts are by weight.

Example 1

A stainless steel lined reaction vessel is charged with 150 parts of deaerated water and 0.32 part of benzoyl peroxide. The vessel is closed, placed in an agitating rack, air removed from the system by sweeping with deoxygenated nitrogen, and the vessel pressured with ethylene containing 5 parts per million of oxygen so that at a temperature of 64° to 71° C. the ethylene pressure is between 900 and 1000 atmospheres. During a reaction time of 7 hours, during which the temperature and pressure are maintained at the indicated values, there is an observed total pressure drop of 480 atmospheres. The vessel is then allowed to cool, opened, and the polymer isolated. There is thus obtained 34 parts of polymer.

The above experiment is repeated except that ethylene containing 200 parts per million of oxygen is used. Under these conditions the yield of polymer is 24 parts and its intrinsic viscosity is 1.65 (measured as a 0.25% solution in xylene).

The above two experiments show that as the oxygen content of the ethylene increases the yield of polymer decreases and the quality of polymer also decreases, as evidenced by the decrease in intrinsic viscosity.

Example 2

A stainless steel lined reaction vessel is charged with 100 parts of water which has been deaerated by boiling and cooling under deoxygenated nitrogen and 0.4 part of benzoyl peroxide. The vessel is closed, placed in an agitating rack, the air removed by sweeping with deoxygenated nitrogen, and pressured with ethylene containing 200 parts per million of oxygen so that at a temperature of 79° to 82° C., the pressure is 840 to 970 atmospheres. During a reaction time of 11 hours, during which the temperature and pressure are maintained at the indicated values, there is an observed total pressure drop of 480 atmospheres. The reaction vessel is allowed to cool, opened, and the product isolated. There is thus obtained 35 parts of polymer having an intrinsic viscosity of 2 (measured as a 0.25% solution in xylene) and a melting point of 120° C.

Example 3

A stainless steel reaction vessel is charged with 100 parts of water which has been deaerated by boiling and cooling under deoxygenated nitrogen and 0.4 part of benzoyl peroxide. The pH of the mixture is adjusted to 2.6 by the addition of a few drops of dilute formic acid. The vessel is closed, placed in an agitating rack, the air removed by sweeping with deoxygenated nitrogen, and pressured with ethylene containing 1000 parts per million of oxygen to 600 atmospheres. Heating is started, and in a reaction time of 10.75 hours, during which the temperature is maintained at 94° to 97° C. and the pressure at 855 to 950 atmospheres, there is an observed total pressure drop of 340 atmospheres. The vessel is then allowed to cool, opened and the vessel discharged. There is thus obtained 22 parts of polymer melting at 117.5 to 119° C. and having an intrinsic viscosity of 1.09 (measured as a 0.25% solution in xylene).

Example 4

A stainless steel reaction vessel is charged with 100 parts of deaerated water and 0.4 part of benzoyl peroxide. The pH of the mixture is adjusted to 3.4 by addition of a few drops of dilute formic acid. The vessel is placed in an agitating rack, air removed by sweeping with deoxygenated nitrogen, and pressured with ethylene containing from 350 to 400 parts per million of oxygen so that at 94° to 97° C. the pressure is between 750 to 945 atmospheres. In a reaction time of 10.25 hours, during which the temperature and pressure are maintained at the indicated values, there is an observed pressure drop of 845 atmospheres. The vessel is allowed to cool, opened and the contents discharged. There is thus obtained 60 parts of polymer melting at 117.5 to 119° C. and having an intrinsic viscosity of 1.41.

Comparison of Examples 3 and 4 shows that by reducing the oxygen content of the ethylene from 1000 to between 350 and 400 parts per million the observed pressure drop increased from 340 in 10.75 hours to 845 atmospheres in 10.25 hours. The yield of polymer also increased from 22 parts to 60 parts and the viscosity (measured as a 0.25% solution in xylene) from 1.09 to 1.41.

Example 5

A stainless steel lined reaction vessel is charged with 80 parts of deaerated water, 20 parts of monomeric methyl methacrylate, and 0.4 part of benzoyl peroxide. The pH of the mixture is adjusted to 3.2 by addition of a few drops of dilute formic acid. The vessel is closed, evacuated to remove air, and placed in an agitating rack. The vessel is then pressured to 600 atmospheres with ethylene containing 200 parts per million of oxygen. In a reaction time of 10.4 hours, during which the temperature is maintained at 79° to 83° C. and the pressure at 840 to 975 atmospheres, there is an observed total pressure drop of 455 atmospheres. After cooling the vessel is opened and discharged. There is thus obtained 53 parts of polymer having an intrinsic viscosity of 1.4 (measured as a 0.125% solution in xylene). The product analyzes 84.2% carbon and 13.6% hydrogen from which the mole ratio of methyl methacrylate to ethylene is calculated as 1 to 4.4.

The above experiment is repeated using ethylene containing 1000 parts per million of oxygen. In a reaction time of 10.25 hours, during which the temperature is maintained at 94° to 95° C. and the pressure at 870 to 980 atmospheres, the observed total pressure drop is 260 atmospheres. The product obtained has an intrinsic viscosity of 0.46 (measured as a 0.125% solution in xylene) and amounts to 29 parts. The product analyzes 70.2% carbon and 10.7% hydrogen from which the mole ratio of methyl methacrylate to ethylene is calculated at 1 to 2.5.

Comparison of the above two examples shows that using ethylene of commercial quality, i. e., containing 1000 parts per million of oxygen brought about a decrease in the observed pressure drop from 455 to 260 atmospheres and a decrease in yield of polymer from 53 parts to 29 parts. The intrinsic viscosity of the polymer is also reduced from 1.4 to 0.46.

From the viscosity figures given in the examples it will be apparent that for a given set of conditions yield and intrinsic viscosity vary inversely with the oxygen content of the ethylene. The intrinsic viscosity is obtained by calculations from the following equations:

$$[\eta] = \frac{\ln \eta \text{ rel.}}{C}$$

where [$\eta$] = intrinsic viscosity;

$$\eta \text{ rel.} = \frac{\eta \text{ solution}}{\eta \text{ solvent}}$$

C = concentration in grams per 100 cc; and $ln$ is the natural or Naperian logarithm (Staudinger, Zeitsch. Phys. Chem. 171, 129 (1934)).

Molecular weight may be calculated from intrinsic viscosity by means of the following equation:

$$M = \frac{\eta \text{ rel.} - 1}{\frac{C}{1.4} \times 0.85 \times 10^{-4}}$$

where M = molecular weight;

$$\eta \text{ rel.} = \frac{\eta \text{ solution}}{\eta \text{ solvent}}$$

C = concentration in grams per 100 cc. and 1.4 and $0.85 \times 10^{-4}$ are constants for linear hydrocarbon polymers. Viscosities are measured in an Ostwald pipette at 85° C. and since $\eta$ rel. is the only viscosity figure used, this is really $$\eta \text{ rel.} = \frac{\text{Time of efflux of solution}}{\text{Time of efflux of solvent}}$$

the factor for conversion to absolute viscosity cancelling out.

The process of this invention can be operated at temperatures ranging from about 40° to about 350° C. In actual practice, however, it is preferred to operate at temperatures below the critical temperature of water but above the critical temperature at which ethylene forms hydrates. Within this range the preferred temperatures are from about 60° C. to about 250° C.

In the preparation of polymers of ethylene with other organic polymerizable materials the particular temperature used depends upon the polymerizing characteristics of the other components of the interpolymer. As a general rule the temperature employed falls within the range of 60° to 250° C.

The particular pressure employed in any one case depends on the polymerizing characteristics of the reactants. Generally, pressures in excess of 50 atmospheres and up to 3000 atmospheres are employed. As a general rule, however, satisfactory results are obtained employing pressures in the range of 300 to 1500 atmospheres.

All other factors being kept constant, the oxygen content of the ethylene controls the rate of reaction and temperature at which reaction will take place. It also controls, under a given set of conditions, the yield and viscosity of polymer obtained. As the oxygen content of the ethylene increases the higher the temperature which must be employed, the lower the yield of polymer for a given reaction period, and the lower the viscosity of the polymer obtained. Within limits the higher the oxygen content of the ethylene the higher the catalyst requirement of the reaction. Ethylene commercially obtained by dehydration of ethanol generally contains oxygen in amounts which range from 1000 parts per million upwards. In the practice of this invention it is desirable to deoxygenate the ethylene so that its oxygen content is less than 400 parts per million and generally below 50 parts per million, and preferably less than 5 parts per million. With oxygen contents ranging from 50 parts per million downward the most efficient operating conditions from the standpoint of reaction rate, polymer yield, polymer viscosity and catalyst requirements are attained.

In the practice of this invention it is generally preferred to use as small an amount of catalyst as possible for economic reasons. As previously pointed out the catalyst requirements of the reaction depend to a large extent upon the oxygen content of the ethylene employed, but generally with ethylene containing less than 400 parts per million of oxygen it is not necessary to use more than 1% of catalyst, based on the total weight of the charge. The preferred catalytic materials are the diacyl peroxides such as diphthaloyl peroxide, benzoyl peroxide, diacetone peroxide, succinyl peroxide, acetyl peroxide, acetyl benzoyl peroxide, meta-brom-benzoyl peroxide, lauroyl peroxide, etc. Other compounds which may be used include hydrogen peroxide, zinc peroxide, peracetic acid, alkali metal persulfates, perborates, and percarbonates, ammonium persulfate, perborate and percarbonate, and in general all those percompounds which are either formed by the action of hydrogen peroxide on ordinary acids or else which give rise to hydrogen peroxide on treatment with dilute sulfuric acid. These materials are per-oxy compounds, as defined in Webster's International Dictionary (1935) Second Edition. Other catalysts which may be used in the practice of this invention and which do not fall under either of the above classifications include p-toluene sulfinic acid, and nitric acid. If desired, combinations of the above catalysts can be used.

By the process of this invention a wide range of interpolymers of ethylene with other polymerizable organic compounds can be made. Thus, ethylene can be interpolymerized with other mono-olefins, e. g., propylene, butylene, amylene, etc., with halogenated mono-olefins, e. g., tetrafluoroethylene, 1,2-dichloroethylene, 2-chloropropene-1, etc., with vinyl ethers, ketones, and esters and other vinyl compounds, e. g., methyl and propyl vinyl ether, methyl and ethyl vinyl ketones, vinyl sulfonic esters, vinyl chloro acetate, N-vinylphthalimide, vinylthiolacetate, methyl vinyl thioether, methyl vinyl sulfone, N-vinylcarbazole, vinyl propionate and acetate, vinyl chloride, etc., acrylic and methacrylic acids, amides, nitriles, and esters, and other acrylic and methacrylic compounds, e. g., methyl, ethyl and propyl acrylates and methacrylates, methylene diacrylate and dimethacrylate, etc., esters of crotonic and itaconic acids, e. g., methyl crotonate and diethyl itaconate, etc., dienes, e. g., butadiene, 1-cyanobutadiene-1,3, isoprene, chloro-2-butadiene-1,3, etc., terpenes, e. g., limonene, camphene, etc., vinyl compounds such as styrene and methyl styrene.

By the process of this invention copolymers can also be made, by which term is meant the products obtainable by the polymerization of ethylene with one or more polymeric materials resulting from the polymerization of organic compounds of the above mentioned types.

In commercial practice a continuous process offers advantages of efficiency, more accurate control and especially in the case of interpolymers better opportunities for adjusting the ratio of interpolymerizing ingredients. For most efficient operation in a continuous process, a rapid rate of reaction is necessary. With many polymers and especially with ethylene containing less than 50 parts per million of oxygen and an acyl peroxide catalyst the most rapid polymerization is obtained in operating at a pH in the range of from 3.5 to 6.

The essential conditions used in the continuous operation, technique of agitation, control of pH, isolation of finished product, and recirculation of unreacted materials can be varied widely. For example, ethylene under pressure can be mixed continuously with water containing a peroxide compound and the resulting mixture maintained in a turbulent state, passed under pressure to a reactor in which the time of contact and temperature are controlled to effect the required degree of polymerization. The contents of the reaction vessel can be passed into an area of lower pressure to recover unreacted ethylene and the polymer can be isolated by any means known to the art, e. g., filtration. When interpolymerizing ethylene with a liquid unsaturated compound, the latter can be introduced continuously with the water phase. When it is desired to interpolymerize continuously two unsaturated gases, both of which have critical temperatures below the operating temperature, for example, ethylene and tetrafluoroethylene, the gases can be premixed in the desired proportions and brought into contact with the water phase under pressure or the gases can be injected separately into the water phase in the desired proportion.

For more rapid polymerization it is necessary to provide intimate contact between all the reactants by agitation, by which term is meant any means for accomplishing intimate contact between the reactants, e. g., rapid stirring, turbulence in a continuous flow process, atomization, shaking, or efficient bubbling of the gas or gases through the water phase.

In the process of this invention it is desirable to use equipment fabricated of or lined with materials which will not catalyze too rapidly the decomposition of peroxide to molecular oxygen. Examples of such lining materials are silver, stainless steels, e. g., steel containing 18% chromium and 8% nickel, aluminum, tin, glass, etc.

The term polymer as used in the claims refers to the product made by polymerizing ethylene alone or admixed with other polymerizable organic compounds.

Although the examples illustrate the practice of this invention using water as the menstruum it is to be understood that if desired part of the water can be replaced by an organic compound, preferably a volatile liquid organic compound such as isooctane, toluene, butyl acetate, ethyl ether, normal hexane, cyclohexane, cyclohexanol, methanol, ethanol, butanol, meta-bromtoluene, petroleum ether and the like.

The process of this invention employing ethylene containing less than 400 parts per million of oxygen offers marked advantages over processes employing commercial ethylene that contains 1000 or more parts of oxygen. Thus, under a given set of conditions for a given amount of ethylene higher yields of higher intrinsic viscosity, and hence higher molecular weight polymers, are obtained than with commercial ethylene; the reaction can also be carried out at a lower temperature and with smaller catalyst consumption, both of which are important economic advantages in the commercial operation of the process. As shown by the examples by lowering the oxygen content of the ethylene from 200 parts per million to 5 parts per million the reaction can be carried out at 64° to 71° C. and approximately the same yield of polymer is obtained in 7 hours as required 11 hours to produce at the highest temperature, 79° to 82° C.

In the preparation of interpolymers the process of this invention is also particularly advantageous since it not only offers a means for preparing a wide variety of products but also is particularly valuable in producing interpolymers of uniform composition. By the process of this invention interpolymers of ethylene can be made which are not readily prepared by prior art methods either because of lack of stability under the operating conditions or because under the operating conditions intimate contact with the ethylene and the other component or components of the interpolymer is not obtained.

Various changes can be made in the specific embodiments of this invention without departing therefrom or sacrificing any of the advantages thereof.

I claim:

1. In a process for polymerizing ethylene, the step which comprises carrying out the polymerization of ethylene in the presence of from 0 to 50 parts per million of molecular oxygen, and in the presence of a per-oxy compound catalyst, at a temperature of from 40° to about 350° C., at a pressure between 300 and 1500 atmospheres, the polymerization being conducted in a deoxygenated aqueous medium.

2. In a process for polymerizing ethylene, the step which comprises carrying out the polymerization of ethylene in the presence of from 0 to 50 parts per million of molecular oxygen, and in the presence of a per-oxy compound catalyst, at a temperature of from 40° to about 350° C., at a pressure between 300 and 1500 atmospheres, the polymerization being conducted in an aqueous medium during polymerization, with intimate contact between the ethylene and a deoxygenated aqueous medium.

3. In a process for polymerizing ethylene, the step which comprises carrying out the polymerization of ethylene in the presence of from 0 to 50 parts per million of molecular oxygen, and in the presence of an organic peroxide compound catalyst, at a temperature of from 40° to about 350° C., at a pressure between 300 and 1500 atmospheres, at a pH from 3.5 to 6, inclusive, the polymerization being conducted in an aqueous medium with intimate contact between the ethylene and a deoxygenated aqueous medium.

4. In a process for polymerizing ethylene, the step which comprises carrying out the polymerization of ethylene in the presence of from 0 to 50 parts per million of molecular oxygen, and in the presence of a benzoyl peroxide catalyst, at a temperature of from 40° to about 350° C., at a pressure from 300 to 3000 atmospheres, the polymerization being conducted in an aqueous medium with intimate contact between the ethylene and a deoxygenated aqueous medium.

5. In a process for polymerizing ethylene, the step which comprises carrying out the polymerization in the presence of less than 5 parts per million of molecular oxygen and in the presence of a peroxy compound catalyst the reaction being conducted at a temperature of from 40 to about 350° C. at a pressure between 300 and 3000 atmospheres, the polymerization being conducted in a deoxygenated aqueous medium.

ALFRED T. LARSON.